(12) United States Patent
Judkins

(10) Patent No.: US 6,712,115 B2
(45) Date of Patent: Mar. 30, 2004

(54) HEADRAIL FOR DOUBLE SHADE

(76) Inventor: Ren Judkins, 46 Newgate Rd., Pittsburgh, PA (US) 15202

( * ) Notice: Subject to any disclaimer, the term of this patent is extended or adjusted under 35 U.S.C. 154(b) by 0 days.

(21) Appl. No.: 09/834,695

(22) Filed: Apr. 13, 2001

(65) Prior Publication Data

US 2002/0046816 A1 Apr. 25, 2002

Related U.S. Application Data

(60) Provisional application No. 60/197,192, filed on Apr. 14, 2000.

(51) Int. Cl.[7] .................................................. E06B 9/30
(52) U.S. Cl. ................... 160/32; 160/84.01; 160/84.04; 160/170 R; 160/178.1 R
(58) Field of Search .................. 160/166.1 R, 168.1 R, 160/170 R, 171 R, 173 R, 179, 84.01, 84.04, 84.05, 84.07, 84.08, 108; 248/251, 252

(56) References Cited

U.S. PATENT DOCUMENTS

| | | | | |
|---|---|---|---|---|
| 2,027,280 A | * | 1/1936 | Lindemann | 160/902 X |
| 2,467,431 A | | 4/1949 | Kellogg | |
| 2,549,905 A | * | 4/1951 | Jablon | 160/902 X |
| 4,344,474 A | * | 8/1982 | Berman | 160/121 |
| 4,724,885 A | | 2/1988 | Chang | |
| 4,919,185 A | * | 4/1990 | Comeau et al. | 160/178.1 |
| 5,180,130 A | * | 1/1993 | McMichael | 160/902 X |
| 5,186,426 A | * | 2/1993 | Wada | 248/251 |
| 5,205,334 A | | 4/1993 | Judkins | |
| D348,371 S | | 7/1994 | Judkins | |
| 5,353,857 A | * | 10/1994 | Anderson | 160/178.1 R |
| 5,439,042 A | | 8/1995 | Ohanesian | |
| 5,505,418 A | | 4/1996 | Corcoran | |
| 5,533,560 A | * | 7/1996 | Morris | 160/178.1 R |
| 5,584,459 A | * | 12/1996 | Meyer | 248/251 |
| 5,660,219 A | * | 8/1997 | Ford et al. | 160/38 |
| 5,690,156 A | * | 11/1997 | Ruggles | 160/84.04 |
| 5,791,393 A | | 8/1998 | Judkins | |
| 5,927,370 A | | 7/1999 | Judkins | |
| 5,979,848 A | * | 11/1999 | Kuthy et al. | 160/902 |
| 6,108,891 A | * | 8/2000 | Ruggles et al. | 29/434 |
| 6,202,967 B1 | * | 3/2001 | Fraczek | 160/166.1 X |
| 6,299,115 B1 | * | 10/2001 | Kovach et al. | 160/84.05 |
| 6,431,247 B1 | * | 8/2002 | Harrison, Jr. et al. | 160/168.1 R |

FOREIGN PATENT DOCUMENTS

GB  1042800  9/1966

* cited by examiner

*Primary Examiner*—Bruce A. Lev
(74) *Attorney, Agent, or Firm*—Buchanan Ingersoll, P.C.

(57) ABSTRACT

A headrail for a double shade has a modular construction in which a portion of the headrail holds a roller shade and a second portion holds a pleated shade and the two portions are separable from one another. In one embodiment the portion that supports the pleated shade is configured to hold a conventional headrail of a pleated shade. In another embodiment a front assembly supports a pleated shade and contains a base and a curved front wall attached to and extending over the base. A semicircular wall extends between end caps that hold a roller shade. The semicircular wall has a slot that receives a tab on the front wall of the front assembly. A bracket has a top leg with a hook that engages a tab on the semicircular wall and a shoulder on a side leg that carries the rear edge of the semicircular wall. A spring extends from the side leg of the bracket to the front wall retaining the tab on the front wall within the hook on rear wall. This arrangement allows the front assembly to be removed exposing the roller shade for easy removal and replacement.

14 Claims, 7 Drawing Sheets

HEADRAIL FOR DOUBLE SHADE

RELATED APPLICATION

This application is based on provisional application Ser. No. 60/197,192, filed Apr. 14, 2000.

FIELD OF INVENTION

The invention relates to a headrail for window coverings of the type that have a roller shade and a corded shade, such window coverings being known as double shades.

BACKGROUND OF THE INVENTION

There are several types of window coverings available. Roller shades usually have a spring-loaded roller that is mounted on brackets near the top of a window frame. A panel of material is wound onto the roller such that the material can be unrolled to cover the window. Insulated roller shades are available that are quilted with spun batting or foam. This type of shade is more energy efficient but it is bulky and tends to wrinkle. Both types of roller shades have a flat look and are not considered to be as aesthetically pleasing as the full, undulating, multifaceted look provided by drapes, pleated shades or roman shades.

Another type of shade utilizes a pleated panel of material where cords pass through apertures in the material and support the bottomrail. There may be a single layer of material or the panel could be a honeycomb structure. This type of shade is available in a variety of fabrics and materials ranging from opaque to very sheer.

Yet another type of corded shade has a fabric made of a large variety of materials including woven cloth, knitted fabric, non-woven fabric and films, as well as grasses and wood slats woven into fabric-like layers which materials may vary from opaque to sheer. Often rings are connected to the fabric-like layers and cords travel through those rings along the length of the shade. The shade folds in a roman fashion as the layers are raised by the cords.

Sometimes two types of window coverings will be used on the same window. It is common to provide a roller shade and drapery for the same window. In such installations the roller shade and the drapery are hung independently on separate hardware.

In my U.S. Pat. Nos. 5,205,334 and Des. 348,371 I disclose a double layer shade in which a roller shade and a pleated shade are hung on a single headrail. This combination provides a more energy efficient window covering and fits in a very compact space. However, roller shades are difficult to install properly so that they roll up evenly and the counter balance springs needs to be adjusted at installation. Enclosing the roller completely makes it more difficult to install and adjust properly. Should it become necessary to replace the roller shade or the pleated shade the entire headrail must be removed from its bracket and disassembled. This is a time consuming procedure that is very difficult for an average consumer to perform. Consequently, there is a need for a headrail for double shades that is easy to install, to assemble and to disassemble.

SUMMARY OF THE INVENTION

I provide a double shade which is made up of two separate assemblies. A roller shade assembly that is attached to the wall with brackets and a corded shade assembly that is attached to the roller shade assembly. Preferably, the wall brackets can have an extension that can be used to attach the corded shade assembly to the roller shade assembly, but a separate clip or even interlocking shapes can be used to connect the two rails. The modular construction has a bottom base or wall assembly that supports a corded shade and another assembly that carries a roller shade. I prefer that at least one assembly contains an attractively curved front wall that hides the lifting mechanisms and the roller from the observer. The roller shade profile or rail is supported by the brackets which are mounted to the building. The end caps are connected to the end of this rail and support the roller shade tube and also hide the lift mechanisms from the end view. The wall brackets engage the roller shade rail or profile instead of the end caps and therefore give the installer more options on placement of screws. This arrangement should allow the roller shade to be installed and adjusted first before attaching the corded shade. It may be desirable to install just the roller shade and have the option to add the corded shade later. This is helpful in many situations, where a homeowner may be building a new home or simply remodeling and would prefer to wait until the other decorative elements of the room such as the carpet, paint, wallpaper or furniture are in place before they select the front or corded shade. Some customers may even wish to change the front shade seasonally to match different solar lighting conditions or just to change the mood of the room to match the season.

It is also useful to a fabricator or retailer to use the same inventory to provide a roller shade alone. This also creates a future sales opportunity to add a corded shade. Embodiments having the front wall which faces the room as a part of the roller shade assembly are particularly useful in this case when the customer wants to install the roller shade alone since the front wall provides a valance to hide the roller.

Embodiments where the front wall is attached to the corded shade base provides a means for readily wrapping that front face with the same fabric as the corded shade. This gives the decorator the option of selecting a painted front wall or wrapping the front wall to match or accent the corded shade which is also in front.

The modular concept allows the retailer a unique sales opportunity. The combination of a roller shade with a corded shade allows the advantage of one product to offset the disadvantages of the other. Roller shade fabric can be very inexpensive and is readily available in different densities such as opaque, translucent, and even transparent. It can be made of materials that won't allow water vapor to pass through. Roller shades are more easily side-sealed because of their two dimensional character. Corded shades have excellent edge clearance and a tremendous variety of materials that can be used. Stacking or storage formats can accommodate different fullnesses and presentations. Finally, the decorator can use one to accent or modify the other. Such as a deep green roller shade that is viewed through a delicate white burn-out sheer roman.

Of course, layering different products to achieve depth, variety, and a greater range of light control has been done for many years. However, the modular systems affords a retailer and the homeowner greater convenience by placing similar operational controls in front of both shades on what appears to be a single headrail for easy access and allows the shades to be installed effectively in the same space for fitting the smaller casings of modem multipane windows. Finally, the convenience of easy installation and removal allows the retailer to present the consumer with mix and match options that can proceed in stages as the homeowners needs change. A home builder might include the roller shades with the house when it is built and then let the buyers select the corded shade when they have moved in.

The add-on and mix/match character of the product is so convenient for the consumer and the retailer that buying and selling a window covering in stages becomes a practical and desirable option and corded product categories can be "accessorized" by adding a roller shade "liner" as an option.

DESCRIPTION OF THE PREFERRED EMBODIMENTS

Figure 1:
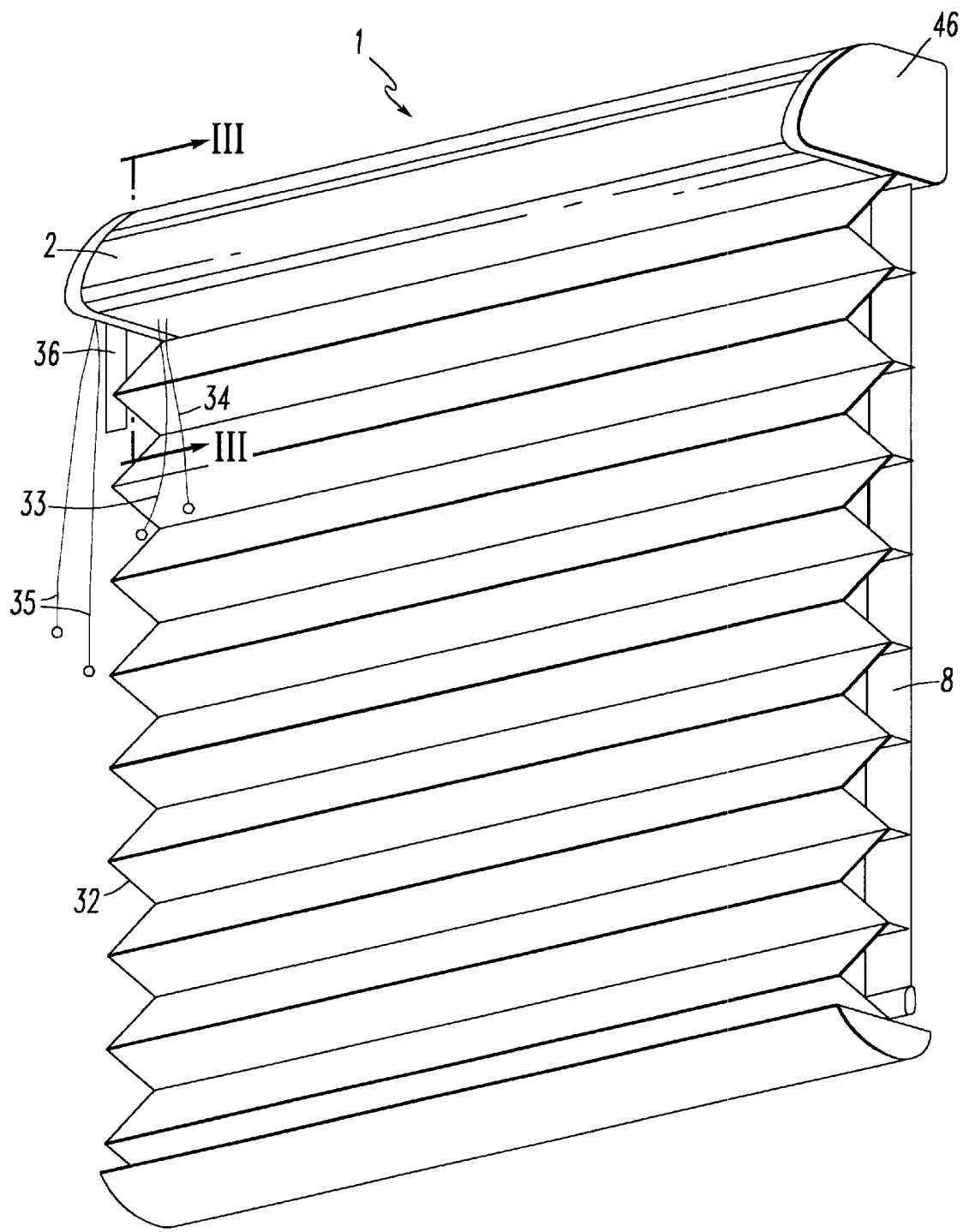
FIG. 1 is a perspective view showing the front of a double shade carried on a present preferred embodiment of my headrail.
Figure 2:
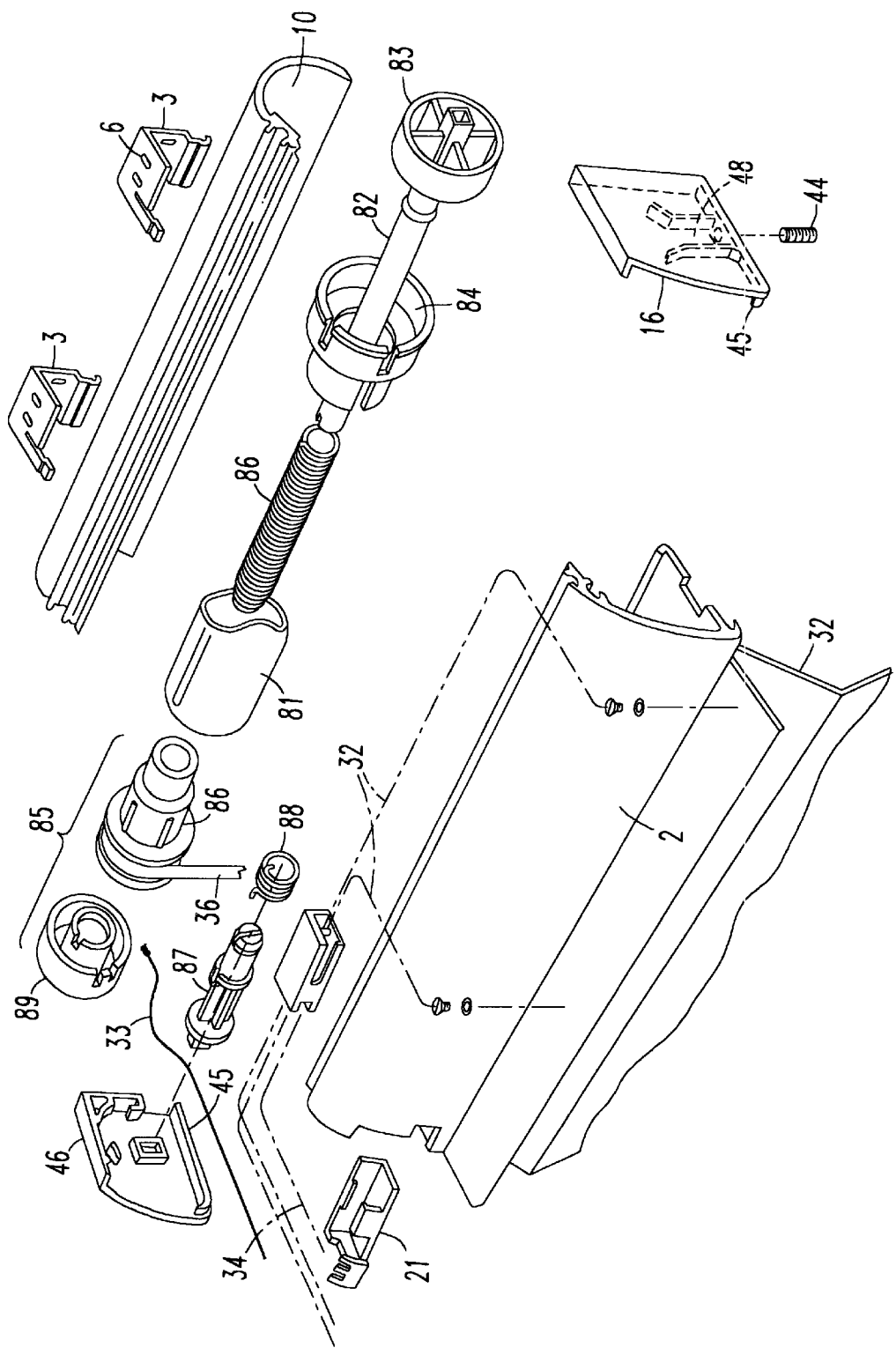
FIG. 2 is an exploded view of a present preferred embodiment of my headrail for a double shade.

As shown in FIGS. 1 and 2, the headrail is made up of the semi-circular back wall 10 that supports the end caps 46 that carry the roller shade tube and a front profile or assembly 2 that supports a pleated shade and presents a decorative face or valance to hide the working mechanisms. In a second preferred embodiment shown in FIGS. 8, 9 and 10, the front assembly is made up of a profile that supports the end caps and the roller shade removably supports the bottom base that carries the corded shade, and also valances the entire headrail from the front or roomside The front assembly shown in FIGS. 1 and 2 has a base 51 and a curved front wall 52. The front wall is attached to the front edge of the base and extends over the top surface of the base. A slot 53 is provided in the rear edge of the front wall 52. The fabric 32 of a pleated shade is attached to the bottom surface of the base. An elongated, semicircular wall 10 extends between the end caps 46 and has a hook 41 at its front edge. The hook 41 receives a tab 42 extending from the inside surface of the front assembly 2. At least two brackets 3 are provided for attaching the headrail to a window frame typically by screws 19. The brackets 3 have a top leg 37 and a side leg 24, which are substantially perpendicular to one another. A hook 18 on one end of the bracket 3 receives a tab 9, extending from the top surface of the semicircular wall 10. A shoulder 23 is provided on the inside surface of the side leg. The rear edge of the semicircular wall 10 rests on that side leg 24. Finally a spring 38 extends from the side leg of the bracket to the slot 53 in the rear edge of the front headrail assembly. The spring retains tab 42 on the inside surface of the front headrail assembly 2 within the hook 41 on the end of wail 10 thereby keeping the front headrail assembly 2, which carries the pleated shade fabric 32, locked onto the wall 10 and brackets 3. The brackets are preferably made of a spring steel or other metal that flexes. As shown by the dotted lines in FIG. 5, the front assembly 2 can be removed from the semicircular wall 10 and brackets 3 by pressing the bottom portion of side leg 24 which releases the lower edge of semicircular wall 2 releasing tab 42 from hook 41. Then the front assembly 2 can be lifted slightly and pulled away from the brackets, end caps and semicircular wall 10 held by tabs 49 and 50 on end caps 46. This combination of wall 10 and end caps 46 is the rear assembly portion of the headrail that carries the roller shade.

Figure 4:
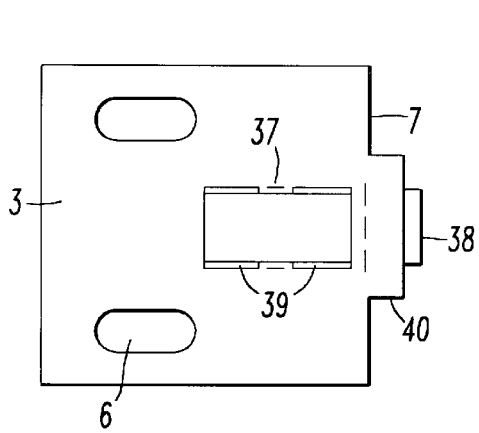
FIG. 4 is a top view of a present preferred bracket used in the headrail shown in FIGS. 1 and 2.

Referring to FIG. 4, two slots 39 are provided in the top leg of the bracket through which the spring 38 passes. A finger 40 extends from the leg 37 to direct the spring 38 toward the slot 53 in the front headrail assembly 2. Holes 6 are drilled in the bracket for mounting screws 19. End caps 46 each have a hub 47 or slot 48 that receives an end of a roller shade 8. I also prefer to provide a leveling screw 44 to adjust one end of the roller. A rail 45 is provided along the bottom edge of the end caps 46, on which the base 51 of the front assembly 2 can rest.

A preferred roller shade 8 shown most clearly in FIG. 2 has a tube 81 to which the roller shade material 27 is attached. A shaft 82 extends from a hub 83 through a plug 84 that fits on one end of the tube 81. The shaft continues through the tube to a release brake 85 attached to one end of the tube 81. As is common in roller shades, balance spring 86 is provided within the tube. The released brake 85 is of the type disclosed in my U.S. Pat. Nos. 5,791,193 and 5,927,370. It has a sprocket 86 though which a core 87 carrying spring 88 passes. One end of the core is attached to shaft 82 while the other end of the core passes through drum 89 and is held in hub 47. The release brake is operated by a ribbon 36 and clutch release cord 33.

Figure 3:
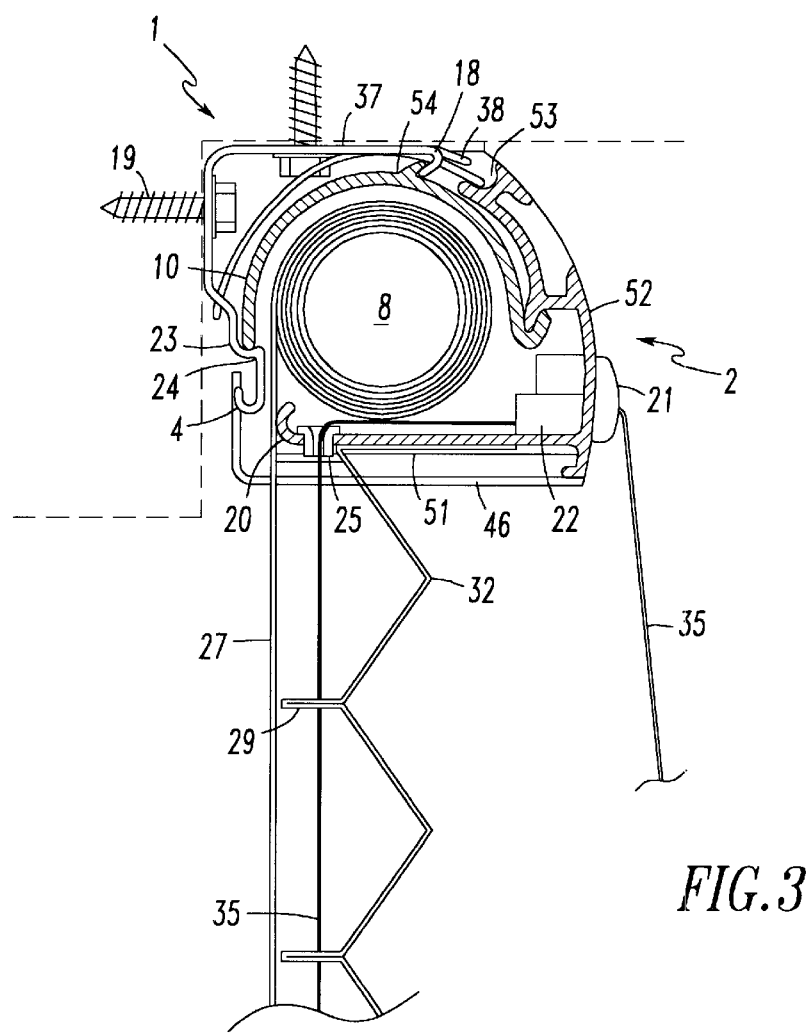
FIG. 3 is sectional; view taken along the line III—III of FIG. 1.

The pleated shade extends from base 51 and is operated by lift cords 35. Each lift cord extends from the bottom of the pleated shade through an eyelet 25 in the base 52 through a cord lock 21. The cord lock may be held on a carrier 22 attached to the inside surface of the base 52. A cord lock release cord 34 is provided that when pulled releases the lock and allows the pleated shade to freely fall. The pleated shade shown in FIGS. 1 through 3 has tabs 29 through which the lift cords pass. If desired standard pleated fabric without tabs, or honeycomb shades could be used.

I further prefer to provide a fabric guide 20 on the rear edge of the base 51 over which the roller shade material 27 passes. Thus, there is a gap between the rear edge of the base and the rear edge of the rear wall through which gap the roller shade material 27 passes.

Figure 5:
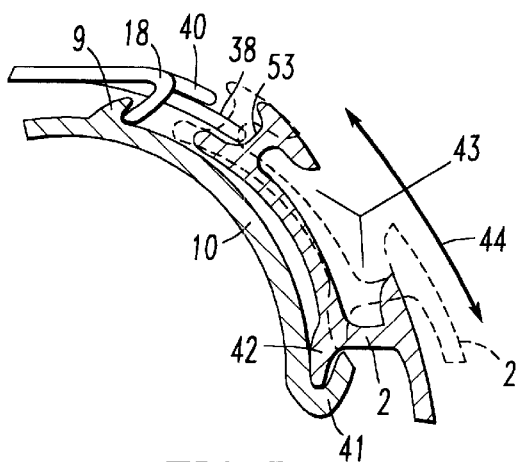
FIG. 5 is a fragmentary view of the mating portions of the headrail in which the removal of the front wall from the rear wall is shown in dotted line.
Figure 6:
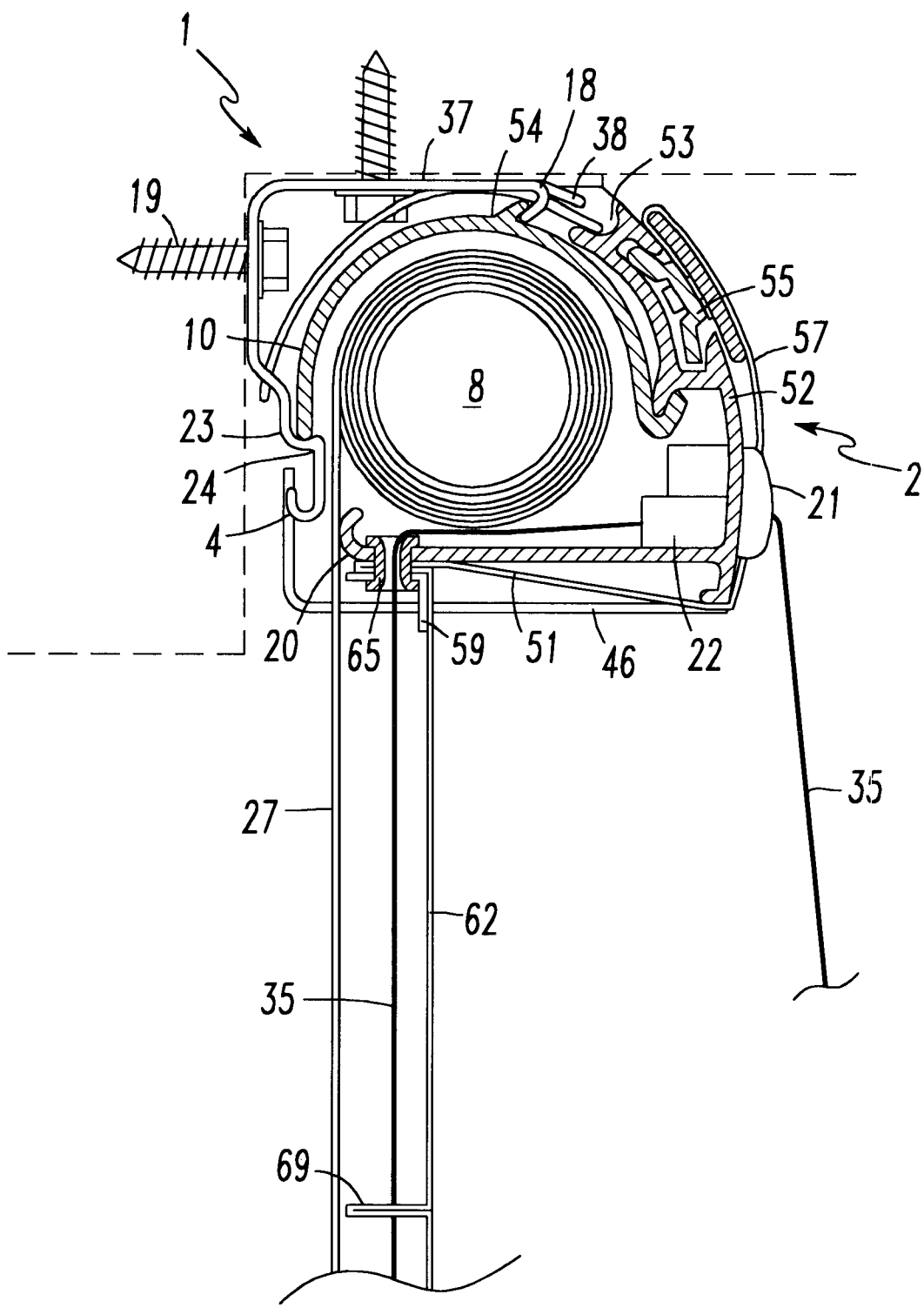
FIG. 6 is a sectional view similar to FIG. 3 of a second preferred embodiment in which has a fabric roman shade with a fabric covering over the front of the headrail.
Figure 7:
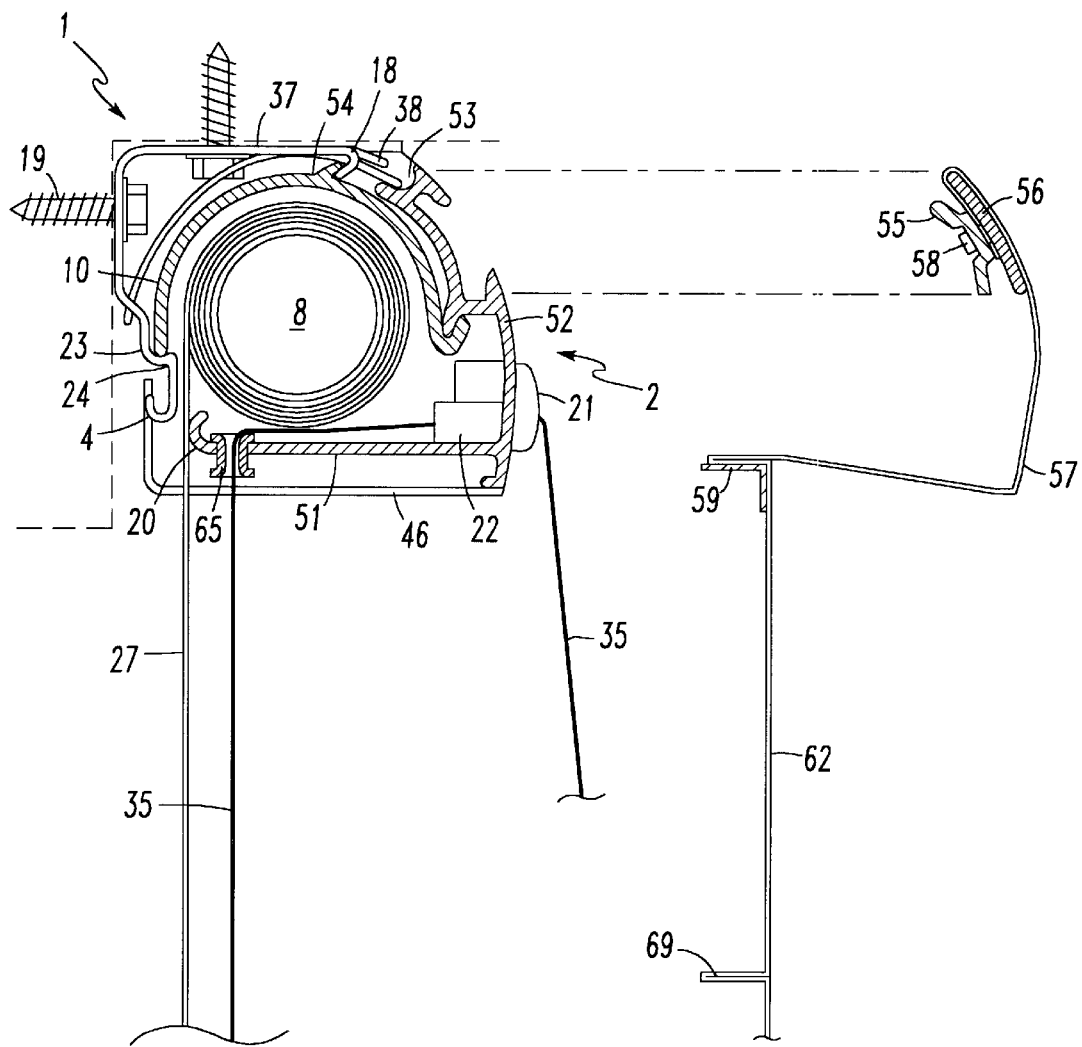
FIG. 7 is a sectional view of the embodiment shown in FIG. 6 showing the fabric roman separated from the headrail.

Referring to FIGS. 5, 6 and 7, there is a slot 43 provided near the rear edge of the front wall 52 of the pleated shade headrail or front assembly 2. This slot is provided to permit the outside surface of the front wall 52 to be covered with a fabric. Often that fabric will be the fabric used for the pleated shade 32. In a preferred embodiment shown in FIGS. 6 and 7 there is a first bar 55 that fits within slot 43. A piece of fabric 57 is provided such that the fabric is sized to cover the outer surface of front wall 53. One end of the fabric is clamped between the first bar 55 and a second bar 56. The bars and fabric extend the full length of the headrail. Staples or other fasteners 58 that are spaced apart along the length of the bars hold the bars 55 and 56 together. After the fabric has been clamped between bar 55 and 56, bar 55 is snapped into slot 43. Fabric 57 is fitted over the outer surface of wall 52 and the bottom edge of that fabric is attached to the underside of base 51 be a channel clip 59. Other methods of attachment are to provide hook and loop type fasteners on the mating surfaces of bars 55 and 56 or to attach the fabric 57 to bar 56 by an adhesive. These fastening methods could also be used to attach the fabric directly to the headrail without having any bars. In the embodiment shown in FIGS. 6 and 7 the fabric that covers the front of the headrail is an extension of a fabric roman shade 62. That shade is raised and lowered by lift cords 35 attached to tabs 69 or folds of fabric on the back of the shade. Although the fabric 57 shown in FIGS. 6 and 7 follows the contour of the front of the headrail, this is not necessary. If desired one could extend the fabric beyond the bottom of the headrail parallel to the lift cord 35 to form a valance.

Another embodiment is very similar to that shown in FIG. 6 and 7. In that embodiment a woven woods roman shade is used instead of the fabric roman shade 62. Woven woods are well known in the art. They have a series of parallel lengths of wood or grass held together by several cords or threads woven transversely across the parallel lengths of grass or wood. The materials that are used in such woven woods are natural ornamental grasses, reeds, bamboo stalks and bamboo sticks as well as imitations of these natural products made from plastic. Although the woven woods give this embodiment a very different appearance, structurally the product is very similar to the embodiment shown in FIGS. 6 and 7. Like the fabric 57 in the embodiment of FIG. 6 and 7, the woven woods could cover the front of the headrail or form a valance.

Figure 8:
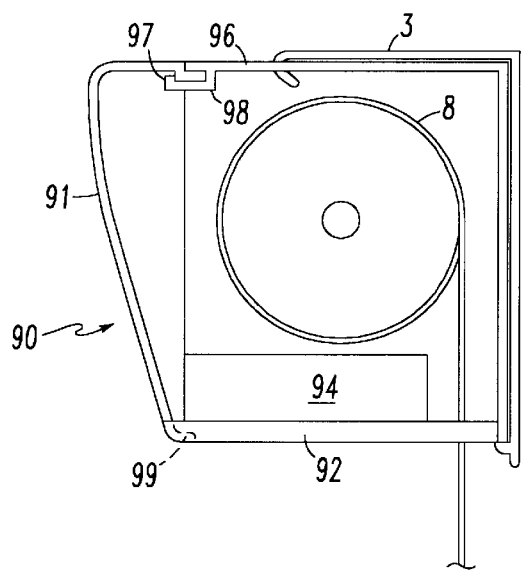
FIG. 8 is an end view of a second present preferred embodiment of my headrail for double shades with the end cap removed.
Figure 9:
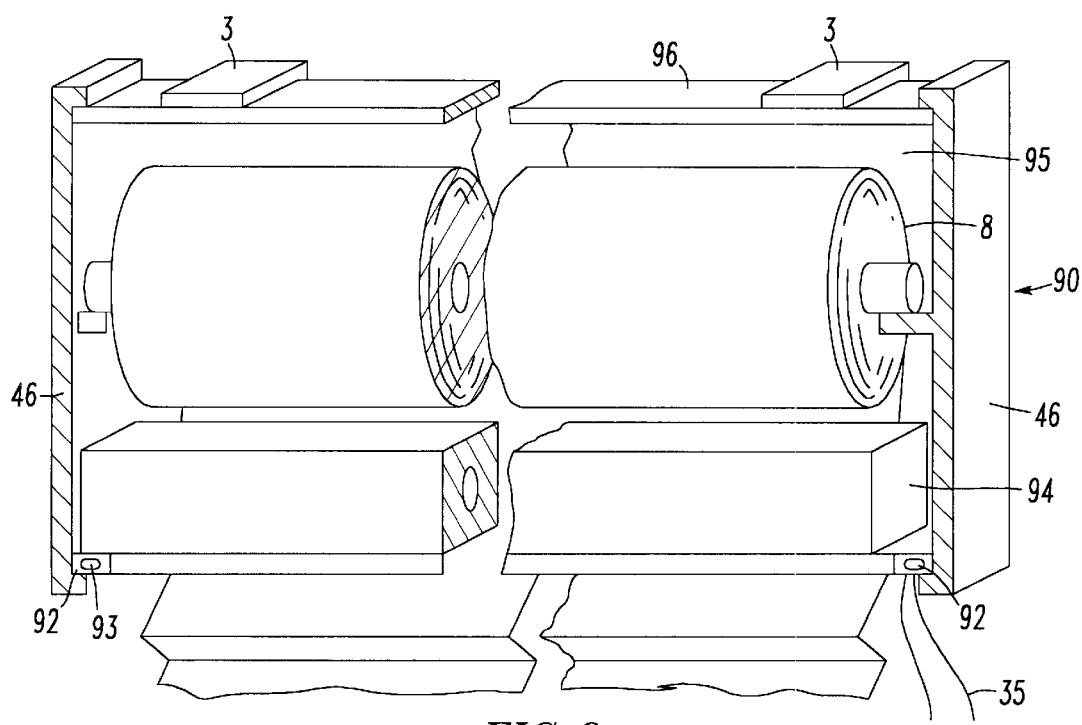
FIG. 9 is a sectional view taken along the line IX—IX in FIG. 8.

A second present preferred embodiment shown in FIGS. 8 and 9 is similar to the embodiment shown in FIGS. 1 and 2. In this embodiment 90 the front assembly has a valance 91. The rear assembly contains a rear wall 95 and top 96. Hooks on either end of the brackets 3 engage the top and rear wall of the rear assembly to mount the headrail on a window frame (not shown). Rails 92 extend from opposite ends of the rear wall 95 and attach to the valance 91. The rails 92 support a conventional headrail 94 for a pleated shade. The headrail 94 is positioned to create a gap between the headrail 94 and the rear wall of the rear assembly allowing the shade material to pass between them. The headrail 94 contains any conventional the cord lock and lift mechanism for the pleated shade. Thus, lift cords 35 exit the headrail at one end. The valance has a tab 97 at its top end that engages a mating tab 98 on the top 96 of the rear assembly. A pin 99 at either end of the bottom edge of the valance fits in a corresponding hole 93 of the end of rail 92. Being connected in this way permits the valance to be easily removed thereby allowing the headrail 94 to be removed. As those skilled in the art will readily recognize, this tab and pin arrangement is only one of several possible ways to removably attach the valance to the top 96 and rails 92. As in the first embodiment, the roller shade 8 is supported by the end caps 46. Although this embodiment is intended to contain both a pleated shade and a roller shade, the modular construction enables the installer to install only a roller shade or a pleated shade. This feature may be important to many buyers who order fabric for a pleated shade that is not immediately available. This headrail could be installed initially with only a roller shade. When the chosen fabric becomes available the valance can be removed, a headrail with the selected fabric can be inserted and the valance can be replaced all without removing the headrail from the window frame.

Figure 10:
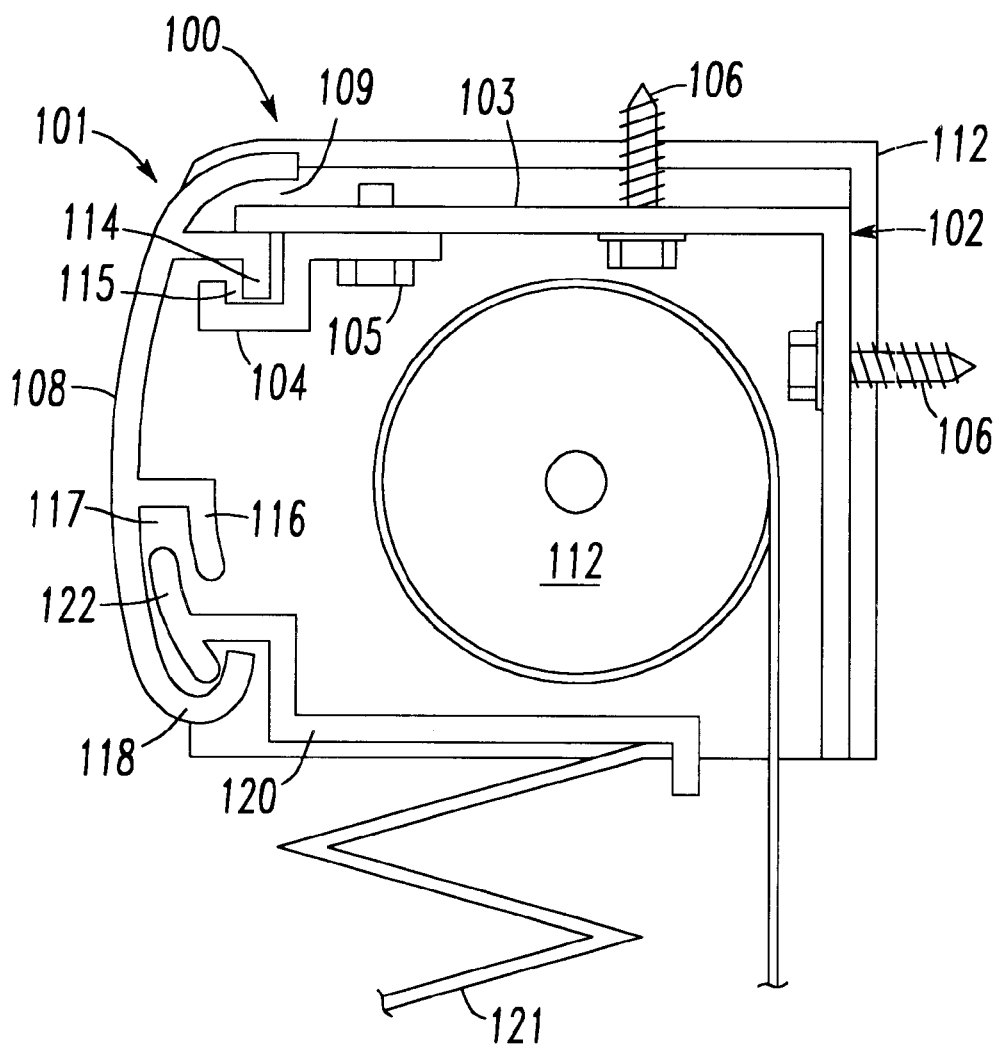
FIG. 10 is a sectional view similar to FIG. 9 of another preferred embodiment of my headrail for a double shade.

Another present preferred embodiment of my headrail for a double shade 100 is shown in FIG. 10. The embodiment includes at least two brackets 102 which may be a two piece bracket having a right angle body 103 and a clip 104 connected together by a screw 105. The bracket is attached to a window frame by one or more screws 106. There is a front rail 108 having end caps 110 at either end. The end caps support a roller shade 112. The brackets, front rail and end caps together form the roller shade assembly 101. The upper end of the front rail 108 has a slot 109 into which the brackets 102 fit. A tab 114 on the top of the top of the front rail fits within a slot 115 in clip 104 to assure a solid connection between the brackets 102 and the front rail 108. The lower portion of the front rail 108 is configured to receive a headrail 120 for a corded shade 121. This corded shade may be a roman shade, a pleated shade or a cellular shade. The front of the corded shade headrail has a T-shaped projection or tab 122 that fits within a slot 117 in the front rail 108. This slot 117 is formed by opposed hooks or tabs 116 and 118. To install the corded shade headrail onto the front rail the installer inserts the upper end of tab 122 into slot 117 while tilting the rear edge of the headrail 120 toward the roller shade 112. It may be necessary to unwind the roller shade to accomplish this. After the lower edge of tab 120 has cleared hook 118 the headrail 20 is rotated to the position shown in FIG. 10. This type of locking tab and hook arrangement is strong enough to support the corded shade headrail. The corded shade headrail can be removed from the roller shade assembly while the roller shade assembly remains hung on a window frame. That means a salesman could sell a customer the headrail shown in FIG. 10 without the corded shade headrail at one point in time and later sell the customer the corded shade headrail with a selected corded shade. The customer or salesman could install the roller shade assembly with a roller shade shortly after the first purchase. When the corded shade headrail is purchased the customer or salesman can install the corded shade headrail onto the roller shade assembly without removing the roller shade assembly from the window frame. The time period between the purchase of the roller shade assembly and the corded shade could be days, weeks or even years.

A significant advantage of all embodiments of the headrail here disclosed is that a retailer or fabricator need only stock one headrail for three types of shades, pleated shades, roller shades and double shades. Those skilled in the art will recognize that the entire headrail can be a rigid plastic such as polyvinyl chloride and that most parts could be extrusions. Alternatively, the extruded parts could easily be made of aluminum or other metal. Furthermore, the shape of the headrail can vary being oval, square, rectangular, hexagonal or other polygon shape.

Conventional roller shades can be held on this headrail as well as the more sophisticated roller shade with release brake shown in FIG. 2. The pleated shade could be made of any material that has been used to make pleated shades. Furthermore, although then pleated shade shown in the drawings is a single panel of fabric, a cellular, pleated shade could be hung from this headrail.

Although I have shown certain present preferred embodiments of my headrail it should be distinctly understood that the invention is not limited thereto, but may be variously embodied within the scope of the following claims.

I claim:

1. A headrail comprising:
   a. an elongated base having a front edge, a rear edge, a top surface and a bottom surface, a left edge and a right edge, the left edge and the right edge each extending from the front edge to the rear edge;
   b. a front wall attached to the front edge of the base and extending above the top surface, the front wall having a front wall edge above and substantially parallel to the base, an inside surface facing the base, and an elongated tab extending from the inside surface, the tab spaced apart from and substantially parallel to the front wall edge;

c. a semicircular rear wall having a front edge with a slot in which slot the tab of the front wall rests, the rear wall having a rear edge and an exterior surface, the rear wall further comprising a rear wall tab on the exterior surface and spaced apart from and substantially parallel to the front edge of the rear wall;

d. at least one bracket having a top leg with a hook that is engaged with the rear wall tab, and a side leg which is attached to and substantially perpendicular to the top leg and having a shoulder on which the rear edge of the rear wall rests such that there is a gap between the rear edge of the base and the rear edge of the rear wall through which gap a roller shade material may pass; and e. a spring extending between the side leg of the bracket and the front wall, the spring retaining the tab of the front wall within the slot in the rear wall.

2. The headrail of claim 1 also comprising a cord lock attached to the base.

3. The headrail of claim 1 also comprising a first end cap attached to the left edge of the base and a second end cap attached to the right edge of the base.

4. The headrail of claim 3 wherein each end cap is configured to receive an end of a roller shade.

5. The headrail of claim 1 also comprising a fabric covering at least a portion of the front wall.

6. The headrail of claim 1 wherein the front wall is curved.

7. The headrail of claim 1 wherein the base, front wall, semicircular wall are plastic.

8. The headrail of claim 1 wherein the elongated base and front wall are an extrusion.

9. The headrail of claim 1 wherein the front wall has an outer surface and a slot in the outer surface and further comprising a first bar fitted within the slot and a fabric panel attached to the bar, the fabric panel sized to cover at least a portion of the outer surface.

10. The headrail of claim 9 also comprising a second bar and at least one fastener wherein one edge of the fabric panel is clamped between the first bar and the second bar and the at least one fastener attaches the first bar to the second bar.

11. The headrail of claim 1 wherein the front wall has an outer surface and further comprising a fabric panel and hook and loop type fasteners attaching the fabric panel to cover at least a portion of the outer surface.

12. A method of selling window coverings on window frames comprising:

a. offering to a customer a headrail having a first portion configured to hold a roller shade and a second portion configured to hold a corded shade wherein the first portion is removably attached to the second portion;

b. selling the headrail and a roller shade to the customer c. installing the roller shade in the first portion of the headrail; and d. connecting the first portion to the second portion; and e. mounting the connected first and second portions on a window frame.

13. The method of claim 12 also comprising offering a corded shade to the customer for attachment to the second portion of the headrail.

14. The method of claim 13 also comprising installing the corded shade on the second portion of the headrail.

* * * * *